(No Model.)
A. CASTRO.
RAILWAY SIGNAL.
No. 338,927. Patented Mar. 30, 1886.
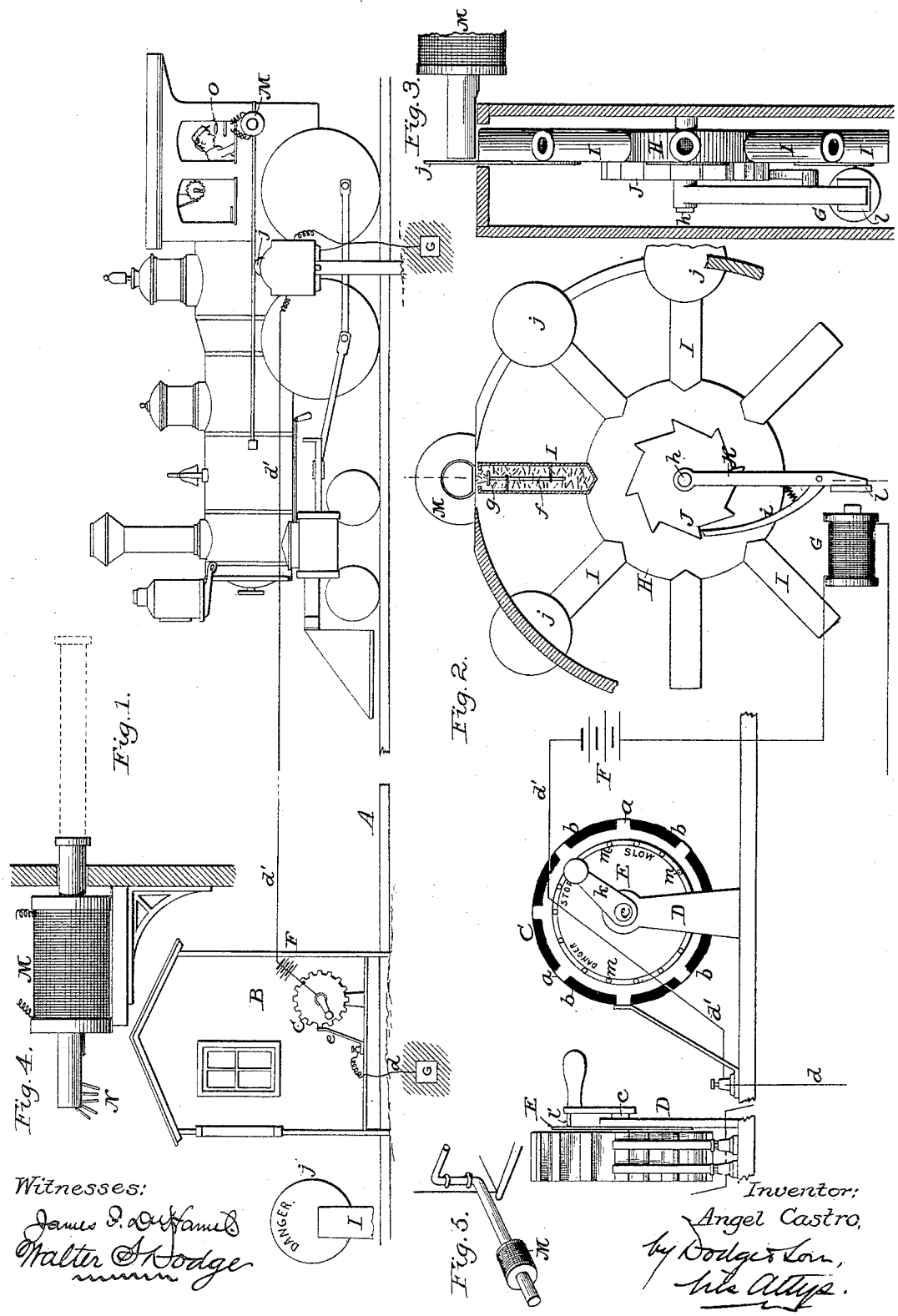
Witnesses:
James I. DuHamel
Walter S. Hodge
Inventor:
Angel Castro,
by Dodge & Son,
his Attys.

UNITED STATES PATENT OFFICE.

ANGEL CASTRO, OF NEW YORK, ASSIGNOR OF ONE-HALF TO GEORGE A. SAWARD, OF BROOKLYN, NEW YORK.

RAILWAY-SIGNAL.

SPECIFICATION forming part of Letters Patent No. 338,927, dated March 30, 1886.

Application filed December 17, 1885. Serial No. 185,943. (No model.)

*To all whom it may concern:*

Be it known that I, ANGEL CASTRO, of New York, in the county of New York and State of New York, have invented certain new and useful Improvements in Railway-Signals, of which the following is a specification.

My invention relates to railway-signals, and contemplates the picking up, by means of a magnet carried by the train, of small disks placed in proper position through the action of electrical devices controlled from a distant point, said disks bearing the information which it is desired to impart to the engineer or conductor of the train.

The details of the apparatus are susceptible of considerable variation, but the arrangement hereinafter set forth will be found simple and efficient.

In the annexed drawings, Figure 1 is an elevation of the apparatus, the track and the line being broken and the stations brought close together for convenience of illustration; Fig. 2, a front elevation of the apparatus, partly in section and likewise closely grouped; Fig. 3, an edge or side view of the signal apparatus proper; Fig. 4, an enlarged view showing the arrangement of the main magnet; Fig. 5, a modification of the same.

A indicates a railway-track along which at suitable intervals—say half a mile, more or less—are signal-stations B. At each station there is located a rotary circuit-breaker consisting of a wheel or drum, C, having its periphery made up of alternate contact and recessed portions $a$ and $b$. This wheel is secured upon a shaft or axle, $c$, mounted in suitable standards, D, to one of which is secured a dial, E, bearing inscriptions indicating the different signals.

The body of the wheel C, which is recessed to form the open spaces $b$, is in electrical connection with the earth through a wire or conductor, $d$, and contact springs or fingers $e$ bear upon the periphery of the wheel or drum and complete an electrical circuit through said wheel and fingers, through line $d'$, battery F, electro-magnet G, and the earth whenever said fingers rest upon the raised portions of the periphery of the wheel, and of course break said circuit whenever the fingers are out of contact with said wheel. This part of the apparatus is designed to be used for setting the signal at a distant point, and operates in connection with mechanism shown in Figs. 2 and 3. This latter mechanism consists of a rotary body or wheel, H, having radial tubular spokes I, each formed with an opening in its outer end and provided with a sliding stem, $f$, bearing at its outer end a small disk or button, $g$, of magnetized steel. When the spoke is below the plane of the axis of the wheel the button and stem fall outward by gravity and close the open end of the spoke, and when above said plane they fall inward and open the same.

Formed upon or made fast to the side of the wheel or body H is a ratchet-wheel, J, having a number of teeth equal to the number of projections or recesses $a$ or $b$ in the periphery of the wheel or drum C. Centered upon and supported by the axle $h$ of wheel H is a swinging lever or rod, K, carrying a spring-pawl, $i$, which engages with the ratchet-teeth when the lever moves in one direction, and rides freely over the same during the reverse or backward movement of said lever.

To the moving end of the rod or lever K is attached a soft-iron armature, L, which is placed within the field of attraction of the electro-magnet G, and is drawn toward said magnet whenever the latter is energized through completion of the circuit, as above explained.

When the circuit is broken, the armature falls away from the magnet, or, if desired, it may be polarized and caused to move back by repulsion, the residual magnetism of the core of magnet G being sufficient to cause such action.

It will be seen that by reason of the above-described construction the lever K will make one movement to and from the electro-magnet for each make and break of the circuit, and hence the wheel H will be caused to rotate exactly in unison with and to the same extent as drum or wheel C.

The wheel H has spokes I, equal in number to the teeth of the ratchet-wheel and to the projections $a$ of the drum or wheel C, and each of said spokes is provided with a signal-plate, $j$, corresponding with one of the signals indicated on the face of the dial E. The shaft $c$ of wheel or drum C is provided with a spring handle or arm, $k$, having a pointed stud or pin, $l'$, which enters one of a series of hollow sockets or depressions, $m$, in the face of the dial, according to the position of said handle, and serves to hold the latter and the wheel C at any desired adjustment.

The signals indicated upon the dial are arranged in the same relation and order as those upon the spokes I of wheel H, and consequently that spoke will be brought uppermost which corresponds with the signal to which arm $k$ is moved upon dial D.

Under this construction and arrangement of parts, in case it becomes necessary to send information from one station to another relative to the condition of the roadway, it is merely necessary to turn the arm $k$, which serves as an indicator, to the signal to be sent, whereupon the same will be displayed at the next station. It is, however, difficult for persons on a moving train to read with certainty a signal by the roadside, and therefore I provide means for giving to the engineer, conductor, or other train official distinct and positive information as to the signal displayed. For this purpose I provide, preferably upon the engine, but elsewhere if found desirable, a magnet, M, either permanent or electro, which, in passing over the open end of the uppermost tubular spoke, shall attach and pick up one or more small metal disks, N, with which said spoke is filled, said disks bearing suitable inscriptions or devices to impart the required information.

As before mentioned, the button $g$ of the stem $f$ of each spoke is magnetized. By reason of such magnetization several of the metallic disks will attach themselves to the button, and those which are upon the outer face thereof, and which would otherwise fall from the tubular spoke when the latter is below the axis of the wheel, are thus retained. As the magnet M passes over the end of the spoke those disks which are upon the outer face of the button $g$ will be removed therefrom by the greatly superior attractive force of the magnet M, and, adhering to said magnet, will be carried along by the train.

The magnet M, or its core, if an electro-magnet, will be arranged to swing, slide, or otherwise move, so that it can be brought into convenient reach of the engineer, conductor, or other official, for the purpose of removing the disks adhering thereto. These disks, although intended to be quite small, may be colored to give the necessary information, or may bear any desired character or inscription, which may be read with or without the aid of a magnifying device.

I preferably provide a lens, O, beneath which the disks may be placed to render the reading easy, while permitting the use of very small disks. By using such small disks I am enabled to pick them up with great ease and certainty while traveling at high speed, and also to place a large number of disks in each of the tubular spokes, so that the apparatus shall remain operative a long time without attention.

When an electro-magnet is employed, the coil may be made stationary, as in Fig. 4, and the core arranged to be withdrawn therefrom by the train official, taking with it the adhering disks; or the whole magnet may be carried by a swinging arm, as in Fig. 5, adapted to be brought to the point required by removing the disks.

Any common step-by-step mechanism electrically controlled may be used instead of that shown.

The disks must of course be of soft iron or other substance capable of being attracted by a magnet.

It is intended also that a circuit make-and-break wheel shall be carried on each train, so that connection may be made with the line at any point, and the signal sent therefrom.

Having thus described my invention, what I claim is—

1. The herein-described signal apparatus, consisting of a rotary carrier provided with a series of disks adapted to be attracted by a magnet and bearing the required information or signals, a ratchet-wheel connected with said carrier, a lever provided with a pawl for rotating the ratchet and carrier and with an armature, an electric circuit, an electro-magnet in said circuit and within attracting distance of the armature, and a circuit maker and breaker placed in the circuit at a distance from the carrier, whereby the carrier may be controlled from a distant point and caused to place any required signal-disk in position.

2. The combination of a rotary carrier provided with a series of holders each containing loose disks, those of each holder bearing different information, an electric circuit, mechanism included in said circuit for effecting the rotation of said carrier from a distance and causing any one of the holders to be brought to a given point, and a magnet carried by the train and arranged to pass in close proximity to said point and to pick up one or more of the disks contained in said holder.

3. In a signal apparatus such as described, a rotary carrier or wheel, H, having tubular spokes I, provided with sliding stems $f$, bearing magnetized buttons $g$, a ratchet-wheel, J, secured to the axle of the carrier, a lever, K, provided with a pawl, $i$, to engage with and rotate the ratchet-wheel, armature L, carried by said lever K, battery F, line $d\ e$, electro-magnet G, and circuit-breaker C, placed within said circuit.

4. The combination of wheel H, having hollow spokes or holders I, provided with loose metallic disks bearing signals, ratchet mechanism J K $i$, for rotating said wheel, armature L, line $de$, battery F, electro-magnet G, and make-and-break wheel C, indicator $k$, for turning said wheel, dial D, bearing signals to correspond with those of the carrier, and a magnet, M, carried by the train, all substantially as described and shown.

5. In combination with a holder adapted to contain loose disks bearing signals and placed close to the line of a passing train, a magnet carried by said train and arranged to travel close to the holder, and a magnifying device also carried by the train, to enable the signal-disks to be easily read.

ANGEL CASTRO.

Witnesses:
WILLIAM W. DODGE,
WALTER S. DODGE.